(12) United States Patent
Suhling

(10) Patent No.: US 7,157,680 B2
(45) Date of Patent: Jan. 2, 2007

(54) PHOTON ARRIVAL TIME DETECTION

(75) Inventor: Klaus Suhling, London (GB)

(73) Assignee: Imperial College Innovations Limited, London (GB)

( * ) Notice: Subject to any disclaimer, the term of this patent is extended or adjusted under 35 U.S.C. 154(b) by 0 days.

(21) Appl. No.: 10/540,557

(22) PCT Filed: Jan. 27, 2004

(86) PCT No.: PCT/GB2004/000324

§ 371 (c)(1),
(2), (4) Date: Oct. 14, 2005

(87) PCT Pub. No.: WO2004/070419

PCT Pub. Date: Aug. 19, 2004

(65) Prior Publication Data

US 2006/0054778 A1    Mar. 16, 2006

(30) Foreign Application Priority Data

Feb. 7, 2003  (GB) ................. 0302868.5

(51) Int. Cl.
*H01J 40/14*  (2006.01)
*H01J 31/50*  (2006.01)
(52) U.S. Cl. .............. 250/207; 250/214 VT; 356/213

(58) Field of Classification Search ........... 250/207, 250/214 VT; 356/213, 222–224, 229
See application file for complete search history.

(56) References Cited

U.S. PATENT DOCUMENTS

| 4,603,250 A | 7/1986 | Contini et al. |
| 6,121,600 A | 9/2000 | Estrera et al. |
| 6,906,318 B1 * | 6/2005 | Bateman et al. ............ 250/281 |
| 6,940,589 B1 * | 9/2005 | Suyama et al. ............ 356/213 |

OTHER PUBLICATIONS

International Search Report of PCT/GB2004/000324, mailed Jun. 1, 2004.
GB Search Report of GB 0302868.5, dated Oct. 28, 2003.

* cited by examiner

*Primary Examiner*—Stephone B. Allen
*Assistant Examiner*—Suezu Ellis
(74) *Attorney, Agent, or Firm*—Nixon & Vanderhye P.C.

(57) ABSTRACT

A photon arrival time detector has the form of a photocathode 4 from which a photoelectron is ejected by an incident photon. The photoelectron is accelerated by an applied voltage to a CCD sensor 6. The voltage between the photocathode 4 and the CCD sensor 6 is time varying such that the arrival energy of the electron at the CCD sensor 6 depends upon the time of its arrival at the photocathode 4. Thus, the arrival time of the photon is represented by the intensity of the pixel event recorded by the CCD sensor 6.

Figure 1:
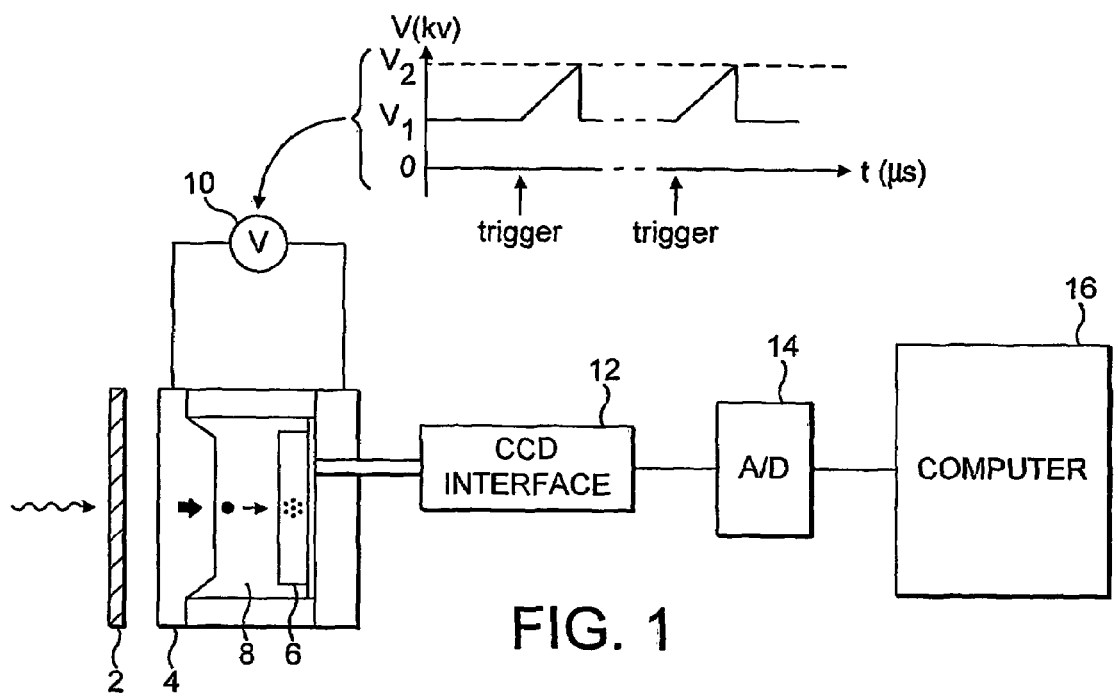

28 Claims, 1 Drawing Sheet $t = kI$

PHOTON ARRIVAL TIME DETECTION

This application is the U.S. national phase of international application PCT/GB2004/000324, filed 27 Jan. 2004, which designated the U.S. and claims priority of GB 0302868.5, filed 7 Feb. 2003, the entire contents of each of which are hereby incorporated by reference.

This invention relates to the field of photon event detection. More particularly, this invention relates to detecting the arrival time of photons, such as, for example, for use in time-correlated single-photon counting, time-resolved imaging, such as fluorescence lifetime imaging, photon time-of-flight measurement for non-invasive IR imaging (optical tomography) and single shot time-correlated single-photon counting.

The use of image intensifiers in photon event counting is a well-established image acquisition technique, for example in astronomy, both on the ground and in space, in auto radiography, bioluminescence and in fluorescence imaging. In photon event counting imaging, a photon impinging on the photocathode of an image intensifier liberates a photoelectron which is multiplied, perhaps millionfold by cascading down microchannel plates. The impact of the resulting large number of electrons onto a phosphor screen output produces a flash or scintillation, i.e. a photon event. The positional information of photons as they impinge on the photocathode is preserved due to the small gaps between the photocathode and the microchannel plates and the microchannel plates and the phosphor (dual proximity focusing). The photon events on the phosphor screen are then imaged with a sensor, such as a charge-coupled device (CCD) or charge injection device (CID).

Thousands of CCD frames captured may be integrated to build up an image. Linearity, high dynamic range, high sensitivity, large area and good spectral response in the ultraviolet are particular strengths of the photon counting approach over other methods, such as direct imaging onto a CCD. However, this technique has no time resolution.

A limited time-resolution can be achieved by recording the intensity variations between frames (i.e. numbers of photons detected in each frame). The time resolution of this approach is constrained by the video readout rate of the CCD, which is typically in the order of milliseconds. This is far too low for use in studying fast phenomena such as fluorescence decay measurements, which typically occur on nanosecond time scales.

It is known to use intensified CCDs using microchannel plates to multiply the electrons in the cascade before they are incident on a phosphor which is imaged by a CCD. Such intensified CCDs have a broad photon event pulse height distribution due to the statistical nature of the electron multiplication process in the microchannel plates. The behaviour of such intensified CCDs is not suitable for encoding the photon arrival time in the pulse height.

It is also known to provide electron-bombarded CCDs such as the CCD Camera 7190 produced by Hamamatsu Photonics K.K. of Hamamatsu City, Japan. An electron-bombarded CCD is an imaging device capable of photon counting, which consists of a photocathode in front of a CCD under vacuum. Photoelectrons, ejected from the photocathode by a photon, are directly accelerated by a high voltage onto the CCD without undergoing a multiplication process and without being converted into light by a phosphor screen. Electron-bombarded CCDs display behaviour such that photon events are highly localised in a single pixel and with a very narrow pulse height distribution. Known electron-bombarded CCDs do not provide any time resolution.

Viewed from one aspect the present invention provides apparatus for measuring an arrival time of a photon, said apparatus comprising:

a photocathode operable to emit an electron when struck by said photon;

a sensor disposed to detect said electron emitted by said photocathode; and an electric field generator operable to generate an electric field to accelerate said electron emitted by said photocathode toward said sensor; wherein said electric field generator is operable to generate an electric field varying with time such that said electron is incident upon said sensor with an arrival energy dependent upon said arrival time of said photon; and said sensor is operable to provide an output signal indicative of said arrival energy.

The invention recognises that by applying a time varying voltage to accelerate the electron from the photocathode to the sensor the energy of the recorded impact of the electron at the sensor can be used to infer the voltage which existed between the photocathode and the sensor when that electron was accelerated and accordingly the time at which the electron was emitted from the photocathode, and therefore the time at which the photon arrived at the photocathode. Thus, by the use of an accelerating voltage (electric field) which changes at a rate matched to the time scale of the phenomena being investigated, it is possible to effectively time-tag the arriving photons by arranging that the electron arrival energy at the sensor will be related to the arrival time of the photon at the photocathode.

Whilst it will be appreciated that the sensor could take a variety of different forms, such as a charge coupled device (CCD), a charge injection device (CID), a CMOS-based CCD or any other position sensitive imaging detector. It is particularly convenient to use a CCD sensor as this type of sensor is available with increasing levels of resolution and performance combined with the ready availability of circuitry for reading out and processing the signals generated by such CCD sensors.

Whilst it is possible to use the CCD sensor as a one-shot type of device, in preferred embodiments the CCD sensor comprises a plurality of pixel cell detectors with different pixel cell detectors being used to separately measure the arrival energies, and consequently arrival times, of respective electrons each corresponding to respective photon events. Thus, a single CCD frame when read out will record multiple photon arrival times with the arrival times being represented by the intensity of the pixel signal.

A particularly convenient way of controlling the electric field generator is that it should generate a voltage difference between the photocathode and the sensor which increases with time starting from a trigger point. Thus, a common trigger may be used for the phenomena being studied, such as a trigger for a fluorescence event or an illuminating pulse of light, and then the voltage difference being applied by the electric field generator between the photocathode and the sensor ramped up or down starting from that trigger event.

In order to increase sensitivity, preferred embodiments are such that the voltage difference is a periodic signal with the trigger event correspondingly being repeated such that multiple images may be captured.

Whilst the periodic signal could have a variety of frequencies, the invention is particularly well suited to systems in which the periodic signal has a frequency of between 0 Hz and 1000 Hz.

Whilst the electric field generator can generate a voltage between the photocathode and the sensor having a variety of levels, the sensitivity of the CCD is such that typical operating voltages will be in the range of 0V to 10 kV.

It will be understood that a problem of saturation may arise whereby multiple photon events are recorded in a single pixel within a CCD. It then becomes impossible to divide the total energy of the electrons received in a pixel into the separate individual energies of the electrons corresponding to different photons and accordingly having different photon arrival times. In order to deal with this problem, the excitation light (or more generally the light illuminating the sample) will be attenuated such that no photon pile-up occurs. Alternatively, an attenuator may be used in front of the photocathode to attenuate photons arriving at the photocathode in circumstances where disadvantageous saturation of the system would otherwise occur.

Whilst it will be appreciated that the photons being detected could have wavelengths extending across a large portion of the electromagnetic spectrum, the present technique is particularly well suited to use with photons having wavelengths between 10 nm and 1000 nm.

It is convenient to provide embodiments of the invention in which the photocathode and the sensor are formed as a sealed structure having a substantial vacuum between the photocathode and the sensor through which the photoelectron may be accelerated.

Whilst the present technique can be used to measure the arrival time of photons in a wide variety of different applications, the present technique is particularly well suited to fluorescence lifetime imaging, photon time-of-flight measurement for non-invasive IR imaging (optical tomography) and single shot time correlated single photon counting.

Viewed from another aspect the present invention provides a method of measuring an arrival time of a photon, said method comprising the steps of:

emitting an electron from a photocathode struck by said photon;

generating an electric field to accelerate said electron emitted by said photocathode toward a sensor; and detect with said sensor said electron emitted by said photocathode; wherein said electric field varies with time such that said electron is incident upon said sensor with an arrival energy dependent upon said arrival time of said photon; and said sensor provides an output signal indicative of said arrival energy.

Figure 2:
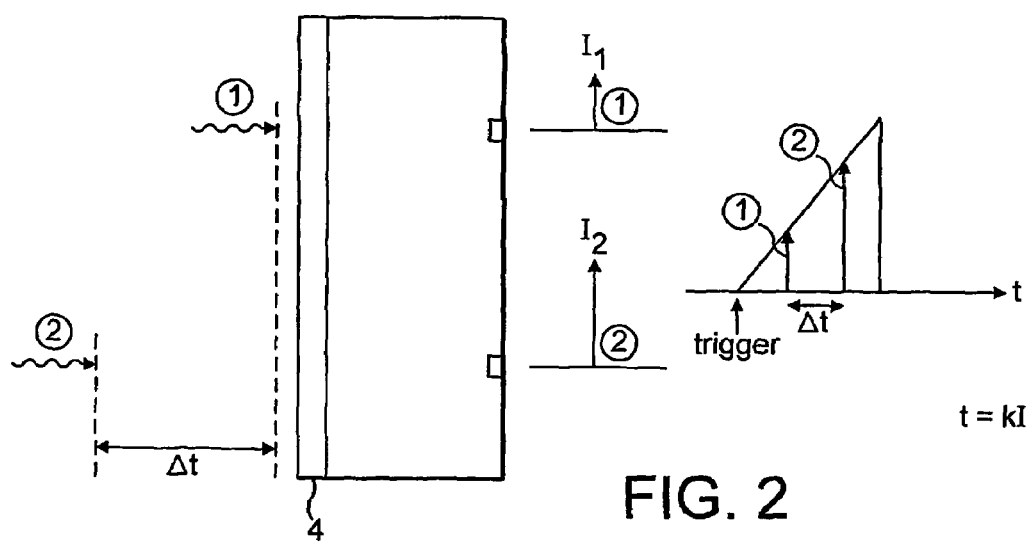

An embodiment of the invention will now be described, by way of example only, with reference to the accompanying drawings in which:

FIG. 1 schematically illustrates an apparatus for detecting photon arrival time; and FIG. 2 schematically illustrates the detection of two photons with their corresponding arrival energies at the sensor.

FIG. 1 illustrates a system including an attenuator 2 (which is optional), a photocathode 4 and a CCD sensor 6. The photocathode 4 and CCD sensor 6 are formed as a sealed unit within which there is a cavity 8 held under substantial vacuum. A photoelectron ejected from the photocathode 4 by an incident photon is accelerated across the cavity 8 by an electric field generated by an electric field generator 10. The accelerated electron is then impacts the CCD sensor 6 where it produces a signal within one of the pixel cell detectors having an intensity related to the arrival energy of the electron. The arrival energy of the electron is in turn dependent upon the electric field which was being applied by the electric field generator 10 whilst that photoelectron was traversing chamber 8. The time taken for the photoelectron to traverse the chamber 8 is much shorter than the time period over which the electric field generated by the electric field generator varies. Thus, the arrival energy of the electron at the CCD sensor is effectively representative of the instantaneous electric field being applied by the electric field generator 10 at the time that the photon was incident upon the photocathode 4. The attenuator 2 can be used to attenuate the number of photons reaching the photocathode 4 such that more than one photoelectron is not incident upon each pixel cell detector (or at least such an occurrence is statistically rare) during one CCD frame period.

A CCD interface circuit 12 reads a frame of pixel cell detector intensity values from the CCD sensor 6 and passes these through an analogue to digital converter 14 to a computer 16 where they are analysed. The detected intensity values of different pixels can be used to determine the arrival time of the photon relative to a trigger event which gave rise to that pixel cell detector signal.

FIG. 1 schematically illustrates the time varying electric field which can be generated by the electric field generator 10. This is in the form of a periodically repeating voltage ramp starting from a trigger event. The voltage values will typically be in the range of 5 kV to 10 kV with a larger possible range of 0V to 10 kV. The frequency of the periodically repeating electric field will typically be of the region of 0 Hz to 1000 Hz.

The system illustrated in FIG. 1 may be responsive to photons having a wide variety of different wavelengths. Typical wavelength ranges are 10 nm to 1000 nm. The wavelength of the photons to which the system is responsive can be adjusted by changing the material of the photo cathode 4. As an example, GaAs is a material particularly well suited to detecting photons in the visible light wavelength range of 400 to 900 nm.

It will be appreciated by those in the field that the system illustrated in FIG. 1 may be readily adapted for use within a wide variety of detection systems such as a fluorescence lifetime imager, photon time-of-flight measurements for non-invasive IR imaging or a single shot time correlated single photon counter.

FIG. 2 schematically illustrates the operation of the system of FIG. 1. As illustrated, two photons are incident upon the photocathode 4. These photons are spaced by a time interval. The first photon produces a photoelectron which is accelerated towards the CCD sensor by a lower voltage than that which is present when the second later photon arrives. Accordingly, the signal recorded in the corresponding pixel of the CCD for the first arriving electron will have a lower intensity (if the voltage is ramped up) than that for the second arriving electron. If the voltage is ramped down, then the signal recorded for the second photoelectron will have a lower intensity. Thus, it will be seen that with a linearly increasing accelerating voltage with time and assuming a linear intensity response to electron arrival energy by the CCD, at least to a first approximation the arrival time of the photon subsequent to a trigger event will be substantially proportional to the intensity of the resulting pixel photon event detected by the CCD sensor. The conversion of pixel intensity into time is obtained by a calibration with a known time interval between a trigger and signal pulse. The calibration depends on the time profile of the voltage ramp.

The invention claimed is:

1. Apparatus for measuring an arrival time of a photon, said apparatus comprising:
   a photocathode operable to emit an electron when struck by said photon;
   a sensor disposed to detect said electron emitted by said photocathode; and
   an electric field generator operable to generate an electric field to accelerate said electron emitted by said photocathode toward said sensor; wherein
   said electric field generator is operable to generate an electric field varying with time such that said electron is incident upon said sensor with an arrival energy dependent upon said arrival time of said photon; and
   said sensor is operable to provide an output signal indicative of said arrival energy.

2. Apparatus as claimed in claim 1, wherein said sensor is a COD sensor operable to store a charge dependent upon said arrival energy.

3. Apparatus as claimed in claim 2, wherein said COD sensor comprises a plurality of pixel cell detectors, different pixel cell detectors being operable to measure a respective arrival energy of an electron corresponding to a photon incident upon said photocathode.

4. Apparatus as claimed in claim 3, wherein each pixel cell detector upon which an electron has been incident outputs a signal dependent upon said arrival energy.

5. Apparatus as claimed in claim 1, wherein said electric field generator is operable to generate a voltage difference between said photocathode and said sensor which changes with time starting from a trigger point.

6. Apparatus as claimed in claim 5, wherein said voltage difference is a periodic signal.

7. Apparatus as claimed in claim 6, wherein said periodic signal has a frequency of between 0 Hz and 1000 Hz.

8. Apparatus as claimed in claim 1, wherein said electric field generator is operable to generate a voltage between said photocathode and said sensor of between 5 kV and 10 kV.

9. Apparatus as claimed in claim 1, comprising an attenuator disposed to attenuate photons arriving at said photocathode.

10. Apparatus as claimed in claim 1, wherein said photons have a wavelength between 10 nm and 1000 nm.

11. Apparatus as claimed in claim 1, wherein said photocathode and said sensor are formed as a sealed structure substantially having a vacuum between said photocathode and said sensor.

12. Apparatus as claimed in claim 1, wherein said apparatus is a fluorescence lifetime imager.

13. Apparatus as claimed in claim 1, wherein said apparatus is a detector for a time-of-flight measurement of photons for non-invasive IR imaging.

14. Apparatus as claimed in claim 1, wherein said apparatus is a single shot time correlated single photon counter.

15. A method of measuring an arrival time of a photon, said method comprising the steps of:
   emitting an electron from a photocathode struck by said photon;
   generating an electric field to accelerate said electron emitted by said photocathode toward a sensor; and
   detect with said sensor said electron emitted by said photocathode; wherein
   said electric field varies with time such that said electron is incident upon said sensor with an arrival energy dependent upon said arrival time of said photon; and
   said sensor provides an output signal indicative of said arrival energy.

16. A method as claimed in claim 15, wherein said sensor is a CCD sensor operable to store a charge dependent upon said arrival energy.

17. A method as claimed in claim 16, wherein said COD sensor comprises a plurality of pixel cell detectors, different pixel cell detectors being operable to measure a respective arrival energy of an electron corresponding to a photon incident upon said photocathode.

18. A method as claimed in claim 17, wherein each pixel cell detector upon which an electron has been incident outputs a signal dependent upon said arrival energy.

19. A method as claimed in claim 15, wherein said electric field generator is operable to generate a voltage difference between said photocathode and said sensor which increases with time starting from a trigger point.

20. A method as claimed in claim 19, wherein said voltage difference is a periodic signal.

21. A method as claimed in claim 20, wherein said periodic signal has a frequency of between 0 Hz and 1000 Hz.

22. A method as claimed in claim 15, wherein said electric field generator is operable to generate a voltage between said photocathode and said sensor of between 5 kV and 10 kV.

23. A method as claimed in claim 15, comprising an attenuator disposed to attenuate photons arriving at said photocathode.

24. A method as claimed in claim 15, wherein said photons have a wavelength between 10 nm and 1000 nm.

25. A method as claimed in claim 15, wherein said photocathode and said sensor are formed as a sealed structure substantially having a vacuum between said photocathode and said sensor.

26. A method as claimed in claim 15, wherein said method is part of a method of fluorescence lifetime imaging.

27. A method as claimed in claim 15, wherein said method is part of a method of detection for time-of-flight measurement of photons for non-invasive IR imaging.

28. A method as claimed in claim 15, wherein said method is part of a method of single shot time correlated single photon counting.

* * * * *